(12) United States Patent
Herbert et al.

(10) Patent No.: US 10,054,268 B2
(45) Date of Patent: Aug. 21, 2018

(54) COMPOSITE MATERIAL, COMPONENTS SUITABLE FOR USE IN COMPOSITE MATERIAL AND RELATED METHODS AND STRUCTURES

(76) Inventors: Jim Herbert, Holmfirth (GB); Paul Slater, Huddersfield (GB); Alan Bamforth, Holmfirth (GB)

( * ) Notice: Subject to any disclaimer, the term of this patent is extended or adjusted under 35 U.S.C. 154(b) by 1347 days.

(21) Appl. No.: 13/823,284

(22) PCT Filed: Sep. 14, 2011

(86) PCT No.: PCT/GB2011/051731
§ 371 (c)(1),
(2), (4) Date: Mar. 14, 2013

(87) PCT Pub. No.: WO2012/035347
PCT Pub. Date: Mar. 22, 2012

(65) Prior Publication Data
US 2013/0167942 A1    Jul. 4, 2013

(30) Foreign Application Priority Data
Sep. 14, 2010   (GB) .................................. 1015290.8

(51) Int. Cl.
*F17D 1/00* (2006.01)
*B09C 1/00* (2006.01)
*E02D 17/20* (2006.01)
*E02D 31/02* (2006.01)

(52) U.S. Cl.
CPC ................ *F17D 1/00* (2013.01); *B09C 1/005* (2013.01); *E02D 17/202* (2013.01); *E02D 31/02* (2013.01); *Y10T 137/0402* (2015.04); *Y10T 137/87249* (2015.04)

(58) Field of Classification Search
None
See application file for complete search history.

(56) References Cited

U.S. PATENT DOCUMENTS

| | | |
|---|---|---|
| 3,795,180 A | 3/1974 | Larsen |
| 4,572,705 A | 2/1986 | Vignon et al. |
| 2004/0131423 A1 | 7/2004 | Ianniello et al. |
| 2006/0078386 A1 | 4/2006 | Blackwood |
| 2007/0163192 A1 | 7/2007 | Thronicke et al. |
| 2007/0218789 A1 | 9/2007 | Maggioni |

FOREIGN PATENT DOCUMENTS

| | | |
|---|---|---|
| CN | 2541517 | 3/2003 |
| CN | 101041953 | 9/2007 |
| CN | 201003168 | 1/2008 |
| CN | 101487236 | 7/2009 |
| CN | 201357004 | 12/2009 |
| CN | 101644058 | 2/2010 |

(Continued)

OTHER PUBLICATIONS

Chinese Office Action, Completed by the Chinese Patent Office, dated Aug. 4, 2014, 8 Pages.

(Continued)

*Primary Examiner* — Lashawnda T McKinnon
(74) *Attorney, Agent, or Firm* — Brooks Kushman P.C.

(57) ABSTRACT

A composite material having a plurality of drainage members intersecting to provide interconnected fluid drainage paths.

15 Claims, 6 Drawing Sheets

(56) References Cited

FOREIGN PATENT DOCUMENTS

| | | | |
|---|---|---|---|
| EP | 0100231 | * | 7/1983 |
| EP | 0100231 | | 2/1984 |
| EP | 0259165 | | 3/1988 |
| EP | 0688906 | | 12/1995 |
| GB | 214149 | | 4/1924 |
| GB | 2141459 | | 12/1984 |
| GB | 2190327 | | 11/1987 |
| GB | 2286004 | | 8/1995 |
| GB | 2462994 | | 3/2010 |
| KR | 20090023769 | | 3/2009 |
| WO | 2007100256 | | 9/2007 |

OTHER PUBLICATIONS

International Search Report for PCT/GB2011/051731, Completed by the European Patent Office dated Jul. 2, 2012, 5 Pages.

* cited by examiner

US 10,054,268 B2

COMPOSITE MATERIAL, COMPONENTS SUITABLE FOR USE IN COMPOSITE MATERIAL AND RELATED METHODS AND STRUCTURES

CROSS-REFERENCE TO RELATED APPLICATION

This application is the U.S. national phase of PCT Appln. No. PCT/GB2011/051731 filed on Sep. 14, 2011, which claims priority to GB Patent Appln. No. 1015290.8 filed on Sep. 14, 2010, the disclosures of which are incorporated in their entirety by reference herein.

FIELD OF THE INVENTION

The present invention relates to composite materials and to components suitable for incorporation into composite materials. The present invention further relates to methods of manufacturing composite materials and components suitable for incorporation into composite materials. The present invention still further relates to methods of providing drainage using of the same, and to drainage structures including the same.

BACKGROUND TO THE INVENTION

In geotechnical engineering, man made composite materials are used in place of soil, clay, rock and the like to provide solutions to geotechnical engineering problems. Typical composite materials used in this field comprise two or more components such as textile sheets in combination with a grid, net or core. Typical applications for composite materials are provision of drainage and/or provision of moisture barrier around structures.

FIG. 1 shows a side sectional view of a known composite material 1 in use. The composite material 1 is supplied in sheets made up of drainage strips 10 positioned between textile layers 12. The textile layers 12 are permeable to water, whereas the drainage strips channel water along their length. In use the textile layers 12 are in contact with moist soil allowing water to pass into the drainage strips to be carried away from the soil. However, a problem arises when separate sheets of the composite material 1 are used to build up a drainage system over a large area. To enable efficient drainage, ends of the drainage strips forming a drainage outlet from a first material sheet must be carefully aligned with the ends of drainage strips forming a drainage inlet to a second material sheet. This may not be straightforward in cases where the sheets extend over large distances, are subject to crumpling between drainage strips and the drainage strips themselves are relatively narrow. Furthermore, separate drainage strips can not easily cooperate with one another to distribute drainage flow to other strips should any strip or strips become blocked.

Example embodiments of the present invention aim to address at least one disadvantage of the prior art, whether identified herein or otherwise.

SUMMARY OF THE INVENTION

In a first aspect, the present invention provides a component for a composite material, the component comprising a sheet structure including a plurality of drainage members intersecting one another to provide fluid drainage paths that are mutually interconnected.

Suitably, the component is bounded by a drainage member along one edge thereof. Suitably, the component is bounded by a drainage member along two edges thereof, preferably opposed edges. Suitably, the component is bounded by a drainage member along each of its edges.

Herein, the term "fluid" is to be understood as including any non-solid substance, for example liquids, gases, and combinations thereof. Equally, the term "drainage" includes drawing off of liquid, and venting of gases.

Suitably, the component comprises a sheet. Suitably, the component comprises a roll of material.

Suitably, the component comprises one or more projections on a first side thereof comprising the fluid drainage paths there-between. Suitably, the component comprises recessed portions providing the fluid drainage paths. Suitably, the component comprises one or more projections on a second side thereof. Suitably, the core comprises a random fibre core. Suitably, the core comprises a net core. Suitably, the fluid drainage paths are arranged to enable fluid to move through the core in three dimensions. Suitably, the fluid drainage paths are arranged to enable fluid to move across the first side of the component in two non-parallel directions. Suitably, the fluid drainage paths are arranged to provide a continuous fluid path through the composite material in a one direction, or in two non-parallel directions. Suitably, the fluid drainage paths are arranged to enable fluid to move across the first side of the component from one end thereof to another. Suitably, the fluid drainage paths are arranged to enable fluid to move across the first side of the component from one side thereof to another. Suitably, the fluid drainage paths are arranged to enable fluid to move across the first side of the component from one end thereof to another and from one side thereof to another. Suitably, the fluid drainage paths are all mutually interconnected. Suitably the component comprises a plurality of projections on one or both of first and second sides thereof. Suitably, the projections are of substantially similar shape to each other. Suitably, the projections are distributed in regular arrangement across the component.

Suitably, the drainage members in the plurality of drainage members intersect one another to provide fluid drainage paths that are mutually interconnected. Suitably, the drainage members are formed of crossing strips of drainage material. Suitably, the strips of drainage material are in fluid communication with one another at their intersections. Suitably, the drainage members provide internal capacity for the fluid drainage paths. Suitably, the drainage members comprise projections thereon and wherein the spaces between the projections define a plurality of interconnected fluid drainage paths that allow fluid to run across the first face of the component to thereby form the drainage members.

Suitably, the component comprises a plurality of openings between the drainage members.

Suitably, the or each opening in the component has a boundary comprising a drainage member. Suitably, the or each opening in the component is surrounded by drainage members. Suitably, the openings are arranged with a drainage member there-between. Suitably, the drainage members comprise the fluid drainage paths thereon. Suitably, the drainage members comprise the projections thereon. Suitably, the openings and drainage members are arranged in a regular repeating pattern, preferably a grid or grid-like pattern. Suitably, the drainage members comprise fluid drainage paths that form a first, micro drainage structure of the component, and the drainage members between openings in the component defines a macro drainage structure.

Suitably, the micro drainage structure is provided by fluid drainage paths within the drainage member material.

Suitably, the openings are generally rectangular in shape. Suitably, the openings are generally square in shape. Suitably, the openings are generally triangular in shape. Suitably the openings are generally oval in shape. Suitably, the openings are generally circular in shape. Suitably, the openings are of substantially similar shape to each other. Suitably, the openings are distributed in regular arrangement across the component.

Suitably, the openings comprise more than 10% of the area of the component, preferably more than 20% of the area, more preferably more than 30%, preferably more than 40%, for example more than 50% of the area of the component. Suitably, the openings comprise up to 90% of the area of the component, preferably up to 80%, more preferably up to 70%, preferably up to 60%, for example up to 55% of the area of the component. In especially preferred embodiments, the openings comprise approximately 50%-60% of the area of the component.

Suitably, the openings have a width dimension of greater than 25 mm across the component, preferably greater than 50 mm, more preferably greater than 100 mm, even more preferably greater than 500 mm, for example greater than 1000 mm across the component. Suitably, the openings have a length dimension of greater than 25 mm across the component, preferably greater than 50 mm, more preferably greater than 100 mm, even more preferably greater than 500 mm for example greater than 1000 mm across the component.

Suitably, the drainage members material have dimensions of greater than 25 mm, preferably greater than 50 mm, more preferably greater than 75 mm, for example 100 mm separating openings on the component.

Suitably, the component is made of a fluid impermeable material, and/or has a fluid impermeable outermost layer. Suitably, the component is made of a water impermeable material, and/or has a water impermeable outermost layer. In alternative embodiments the component may comprise a fluid permeable material, or comprise fluid permeable portions, for example to give in plane permeability. Suitably, the fluid drainage paths are provided by fluid permeable portions of the component.

Suitably, the component comprises HDPE.

In a second aspect, the present invention provides a composite material, the material comprising a first component in combination with a second component, wherein the first component is that of the first aspect of the invention.

Suitably, the second component is a sheet. Suitably, the second component is provided on a first side of the first component.

Suitably, the second component is fluid permeable. Suitably, the second component is water permeable. Suitably, the second component is gas permeable. Suitably, the second component comprises a textile. Suitably, the second component comprises a non-woven textile. Suitably, the second component comprises a plastics material. Suitably, the second component comprises a polypropylene material. Suitably, the second component comprises a long staple fibre material. Suitably, the second component comprises a needle punched material. Suitably, the second component comprises a heat-treated material.

Suitably, the second component is fixedly coupled to the first component. Suitably, the second component is fixedly coupled to the first component by adhesive, or by a thermal or other welding process.

Suitably, the second component is coupled to projections of the first component. Suitably, the second component is coupled to projections of the first component such that fluid drainage paths are provided in the space between second component and a first side of the first component.

Suitably, the first and second components extend over the same area. Suitably, the second component covers the entirety of the first component.

Suitably, in use the first component is generally incompressible in response to an applied working load. Suitably, the second component is extensible from a rest position in which it lies above the first side of the component to an in use position in which it extends through the openings in the first component from a first side thereof to a second side thereof in response to an applied working load provided onto the second component from material pressed or pressing against the cover sheet.

Suitably, the composite material further comprises a third component. Suitably, the third component is provided on a second side of the first component. Suitably, the third component comprises some or all of the features described above in relation to the second component.

In a third aspect, the present invention provides a method of manufacturing a component for a composite material, the method comprising forming a sheet structure including a plurality of drainage members intersecting one another to provide mutually interconnected fluid drainage paths.

Suitably, the method comprises arranging a first drainage member across a second drainage member. Suitably, the method comprises arranging a plurality of first drainage members across a plurality of second drainage members. Suitably, the method comprises coupling the drainage members to one another, preferably at their intersections. Suitably, the coupling comprises bonding, for example adhesive or heat welding.

Suitably, the method comprises interweaving a first drainage member with a plurality of second drainage members. Suitably, the method comprises interweaving a first plurality of drainage members with a second plurality of drainage members. Suitably, the drainage members in the first plurality are positioned generally parallel to one another. Suitably, the drainage members in the second plurality are positioned generally parallel to one another. Suitably, the each drainage member in the first plurality intersects each drainage member in the second plurality at a first predetermined intersection angle. Suitably, the each drainage member in the second plurality intersects each drainage member in the first plurality at a second predetermined intersection angle. Suitably, the first and/or second predetermined intersection angle is a right angle.

Suitably, the method comprises stamping out a region(s) of a component blank to form the component, with the drainage members remaining and leaving openings therebetween.

In a fourth aspect, the present invention provides a method of manufacturing a composite material, the method comprising: manufacturing a first component for the material using the method of the third aspect of the present invention and coupling the first component to a second component.

Suitably, the coupling step comprises adhering or welding the first component to a second component.

In a fifth aspect, the present invention provides a method of manufacturing a composite material, the method comprising manufacturing a first component for the material as the component of the first aspect of the present invention and coupling the first component to a second component.

Suitably, the coupling step comprises adhering or welding the first component to a second component.

In a sixth aspect the present invention provides a method of providing drainage using a the composite material of the second aspect of the present invention, or a composite material manufactured according to the third, fourth of fifth aspect of the present invention, the method comprising installing the composite material with the material to be drained such that the second component of the composite material is in contact with the material to be drained.

In a seventh aspect of the present invention there is provided a drainage structure including the composite material of the second aspect of the invention or a composite material manufactured according to the third, fourth of fifth aspect of the present invention.

BRIEF INTRODUCTION TO THE DRAWINGS

For a better understanding of the invention, and to show how embodiments of the same may be carried into effect, reference will now be made, by way of example, to the accompanying diagrammatic drawings in which.

DESCRIPTION OF EXAMPLE EMBODIMENTS

Figure 1:
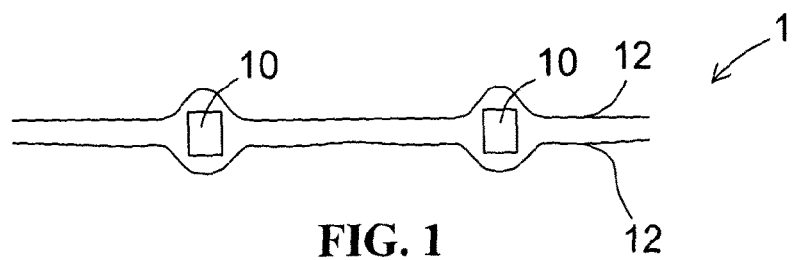
FIG. 1 shows a side sectional view of a known composite material in use.
Figure 2A:
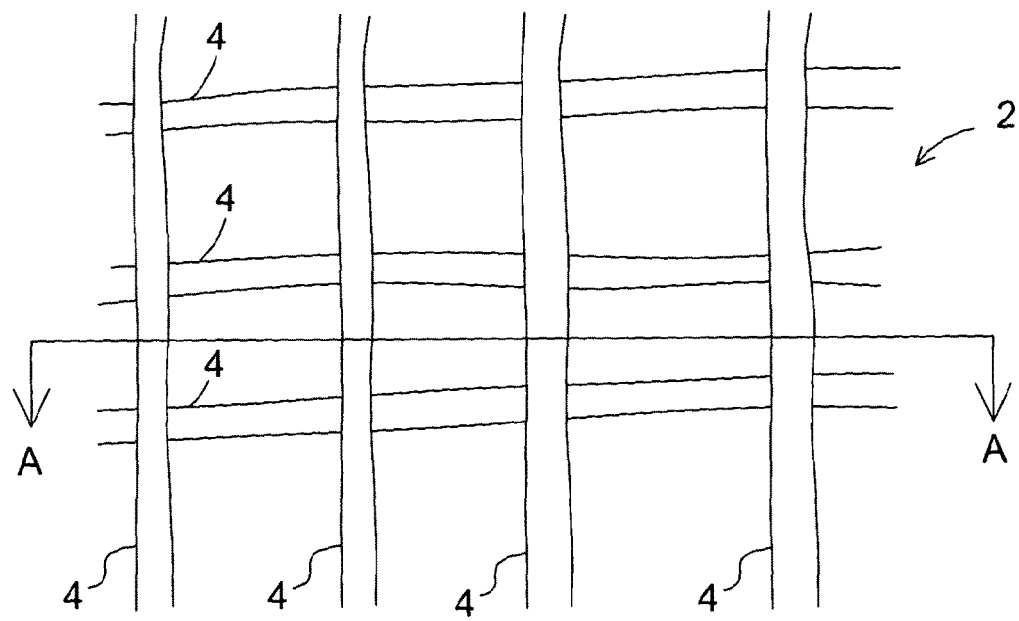
FIGS. 2A and 2B show plan views of portions of components for a composite material, each in accordance with an example embodiment of the present invention.
Figure 3:
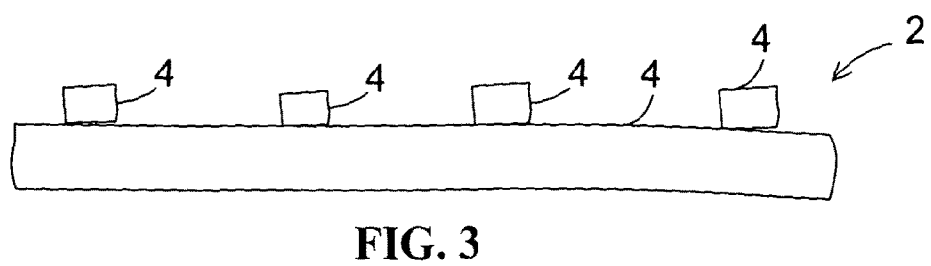
FIG. 3 shows a sectional view along line A-A of FIG. 2A, looking in the direction of the arrows.
Figure 2B:
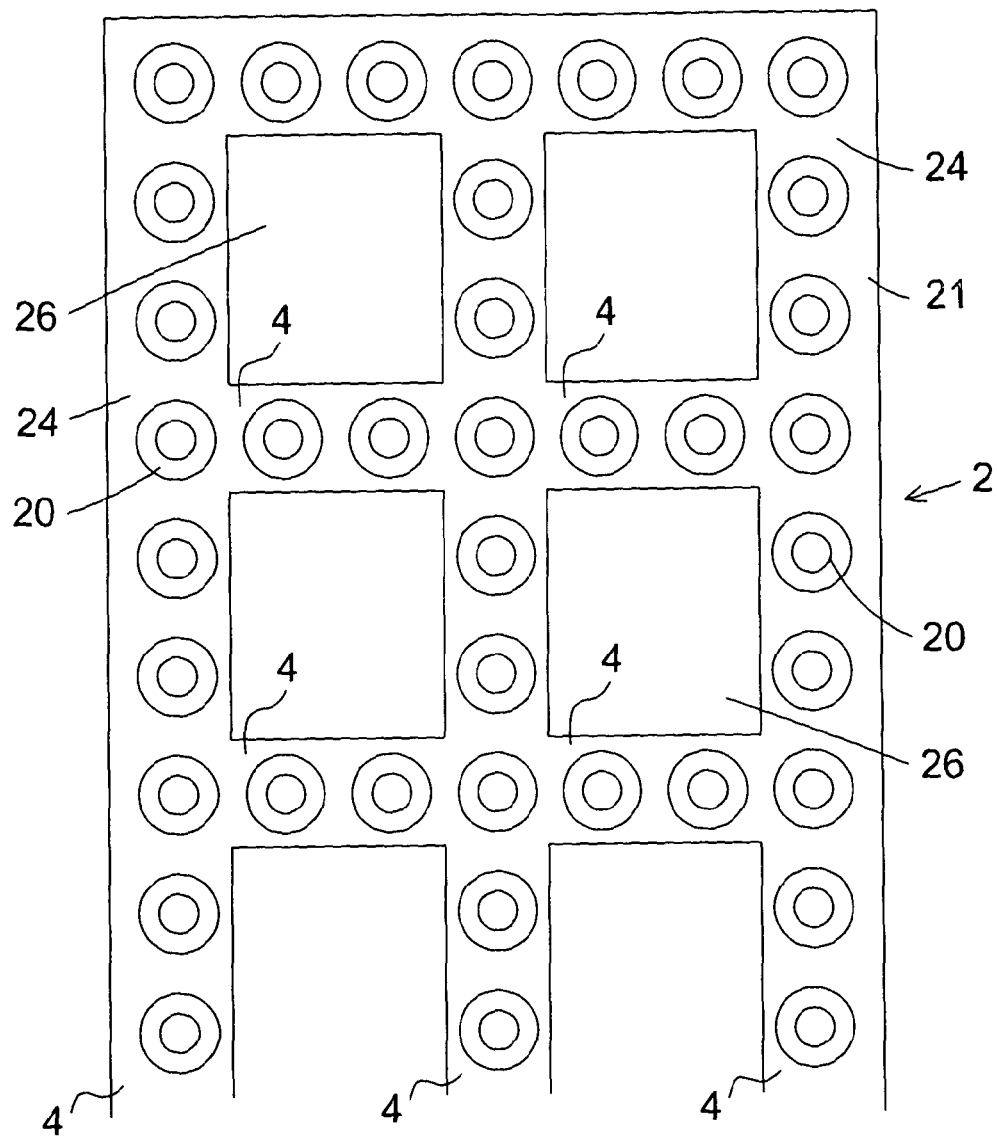

FIGS. 2-8 show parts of components 2 and components 2 for a composite material in accordance with an example embodiment of the present invention. The components 2 comprise a sheet structure including a plurality of drainage members 4 intersecting one another to provide fluid drainage paths that are mutually interconnected.

The components 2 of FIGS. 2A-7B are formed of crossing strips of drainage material. Each strip of drainage material comprises a drainage member 4, and the drainage members 4 are in fluid communication with one another at their intersections. FIGS. 2A, and 3-7B show groups of parallel drainage members 4 intersecting one another at right angles, with elements of one group arranged to lie on elements of the other group, and be attached thereto. FIG. 2B shows drainage members 4 that all lie substantially in one plane. FIGS. 8A and 8B show drainage members 4 that are interwoven with one another. Whereas the components 2 of FIGS. 2A and 3-8B comprise drainage members with internal capacity for providing fluid drainage paths, the component 2 of FIG. 2B provides a plurality of projections 20 extending from a first face 21 thereof. The spaces on the first face 21 and the spaces between the projections 20 define a plurality of interconnected fluid drainage paths 24 that allow fluid to run across the first face 21 of the component 2, to thereby form the drainage members 4. The component 2 further comprises a plurality of openings 26 defined therein to allow communication between the first face 21 and a second, opposite face.

Figure 4:
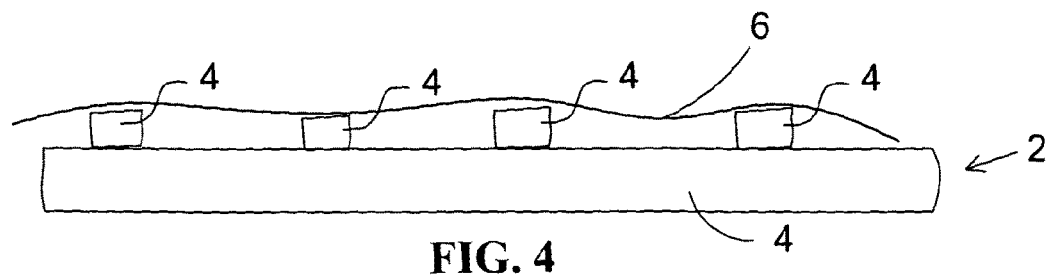
FIG. 4 shows an end view the component of FIG. 2A in combination with a second component to provide a composite material in accordance with an example embodiment of the present invention.
Figure 5:
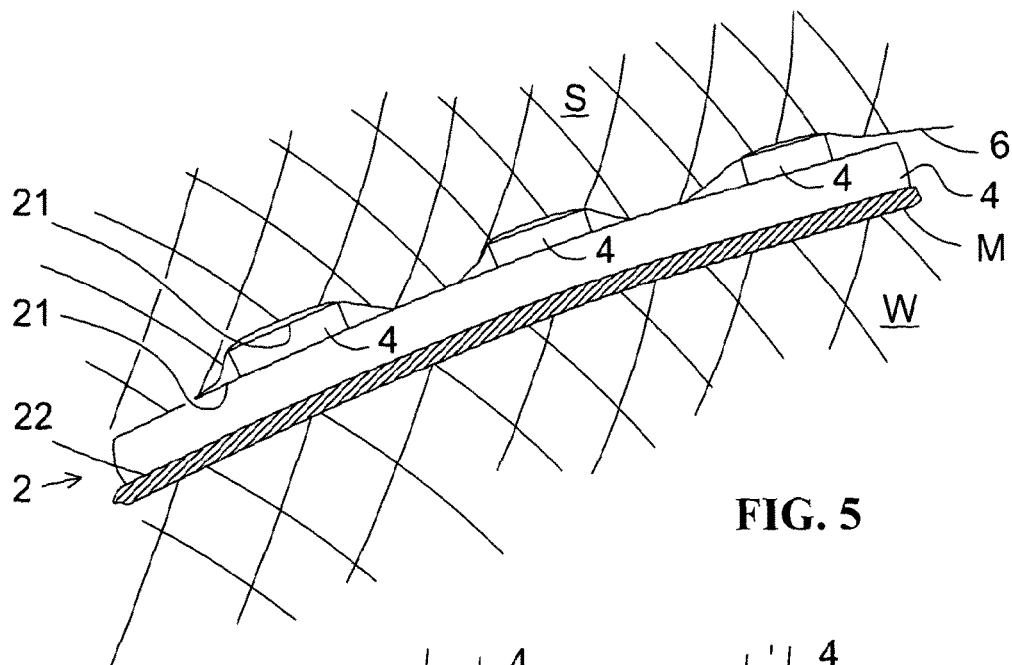
FIG. 5 is a side sectional view of the component of FIG. 2A in use in a drainage structure according to an example embodiment of the present invention.

The component 2 is useful in a composite material for providing fluid drainage, for example in underground applications such as landfill capping. As shown in FIGS. 4 and 5 the composite material may include a second component 6 in the form of a water permeable coversheet. The second component 6 covers the entirety of the first component 2.

FIG. 5 shows a side sectional view of the composite material of first and second components 2, 6 in use in a drainage structure. In this drainage structure a second face 22 of the first component 2 rests on a substantially impermeable membrane M, which itself lies on waste W. The second component 6 is fixed to the first face 21 of the core sheet 2 at the projections 20 and is in contact with moist soil S. The fluid drainage paths provided by the drainage members 4 are formed between the first face 21 of the first component 2 and the second component 6, and allow moisture from the soil S to run generally there-through within the first component 2 to facilitate drainage of moisture from the soil S. The weight of the soil S pressing on the second component 6 presses the second component down and through the openings in the first component 2 that fall between drainage members 4.

In this way the relatively high frictional resistance to sliding of the second component 6 over the substantially impermeable membrane M is achieved, while maintaining good drainage performance using the drainage members 4 of first component 2. In embodiments where there is no fixed coupling between the first component 2 and the second component 6, again frictional engagement there-between to resist shearing forces is enhanced by the effect of the second component 6 pressing on the drainage members 4, e.g. the edges thereof. There are a number of factors in determining the degree to which the second component 6 extends into and through any openings between drainage members 4, including one or more of: the loading applied to the second component 6, the depth of the first component 2, the size and shape of any projections on the first component 2, the size of the openings, and the material properties of the second component 6. It will be appreciated that embodiments of the present invention provide to suitable combinations of these factors to work effectively in typical underground drainage situations where shearing loads may be a design consideration.

Surprisingly, the presence of space in the first component 2 does not have a significant adverse affect on the drainage capacity provided in typical installations. However, the first component includes a smaller amount of material and is hence lighter than an equivalent material without openings. In addition to weight saving, the use of a smaller amount of material can reduce manufacturing costs.

Furthermore, the mutual interconnection between fluid drainage paths in intersecting drainage members 4 enables the first component 2 to be resilient to blockage of drainage members 4, and furthermore facilitates installation of drainage structures using the first component.

Figure 6:
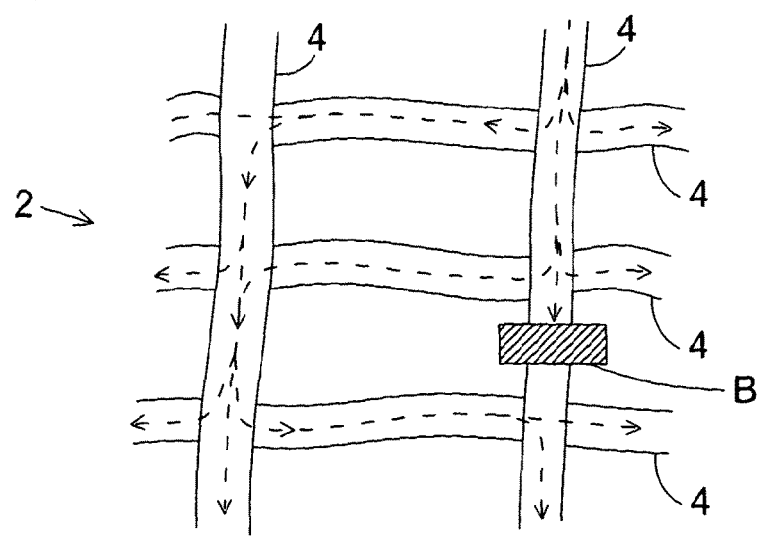
FIG. 6 is a schematic plan view showing blockage of one drainage member and diverted flow in a component in accordance with an example embodiment of the invention.

FIG. 6 shows a first component 2 in which a blockage B has prevented fluid flow along one fluid drainage path. The mutual interconnection of the blocked path with other intersecting mutually connected paths enables the drainage load to be shared by the remaining unblocked fluid flow paths, as shown by the dashed arrows indicating the direction of fluid flow.

Figure 7A:
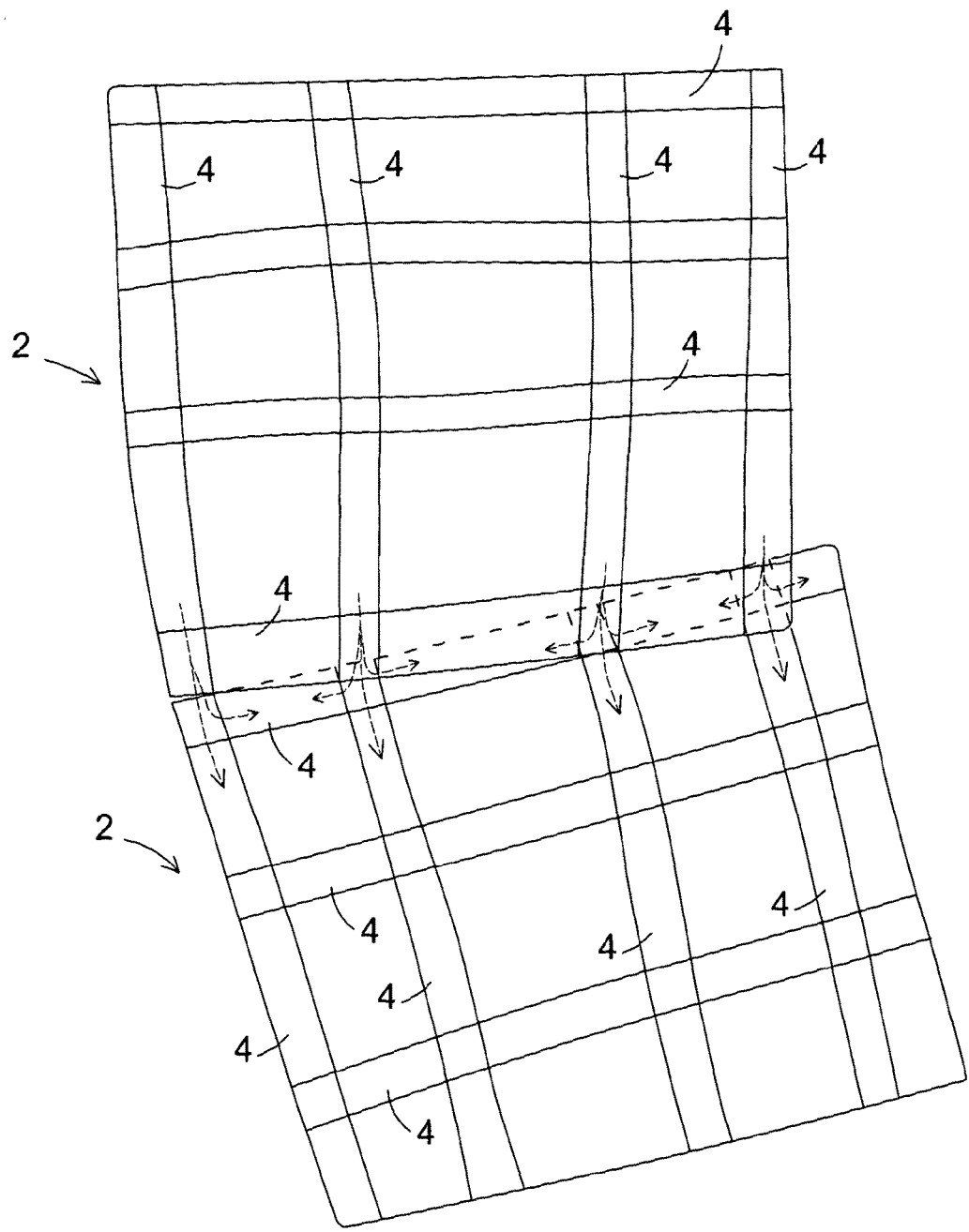
FIGS. 7A and 7B are schematic plan views of overlapping composite material sheets according to example embodiments of the present invention at the edges thereof to enable flow from one sheet into the next.
Figure 7B:
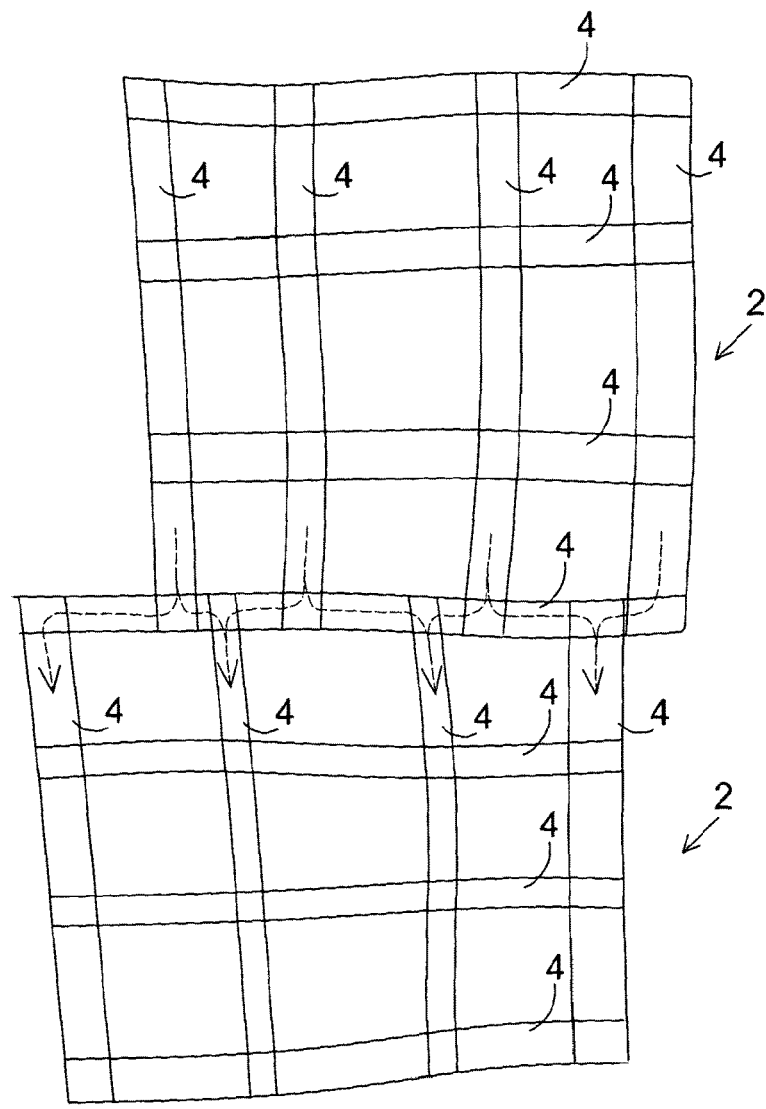
Figure 8A:
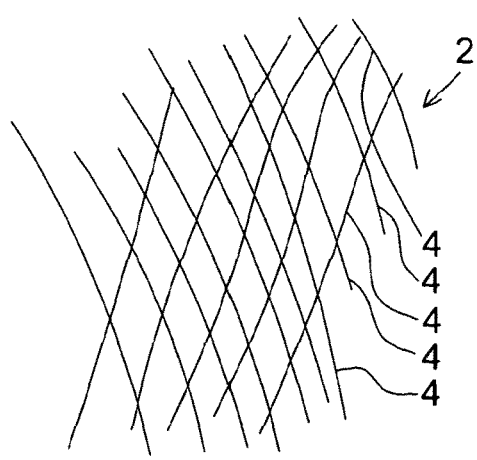
FIGS. 8A and 8B are schematic plans views of other patterns of drainage members useful in alternative embodiments of the present invention.
Figure 8B:
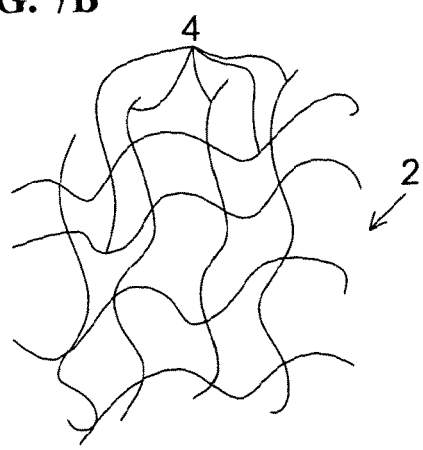

FIGS. 7A and 7B show drainage structures in which adjacent first components 2 are in non-parallel alignment and with offset drainage members respectively. In both cases, the fluid flowing out of the bottom edge of the higher one of the first components 2 is effectively collected into the fluid flow pathways of the lower one of the first components 2. The direction of fluid flow is generally indicated by the dashed arrows. The provision of drainage members that overlap one another contributes, as does the fact that the overlapping drainage members are generally at the edge of the first components 2. In general, overlapping of intersecting drainage members 4 to provide secondary drainage paths that are not parallel to the primary drainage direction contributes to the effectiveness of the drainage structures described herein, and the ease of installation thereof.

Figure 9:
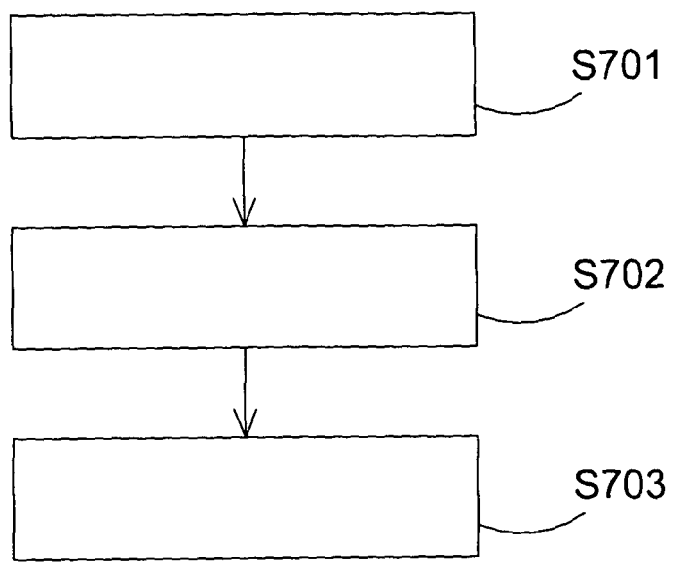
FIG. 9 is a schematic flow diagram illustrating a method of manufacturing a component for a composite material and of manufacturing a composite material according to example embodiments of the present invention.
Figure 10:
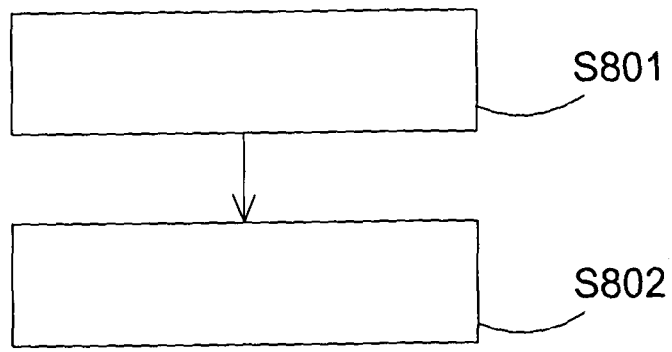
FIG. 10 is a schematic flow diagram of a method of providing drainage using a composite material according to an example embodiment of the present invention.

FIG. 9 is a schematic flow diagram illustrating a method of manufacturing a first component 2 (steps S701 and S702) and of manufacturing a composite material (S703), according to example embodiments of the present invention.

At step S701 a plurality of intersecting drainage members with fluid flow pathways provided thereon or therein is arranged such that the fluid flow pathways are mutually interconnected. The second step S702 comprises coupling the drainage members to one another, for example by heat bonding. In alternative methods of manufacturing, the first component may be formed by combining separate drainage members, e.g. by overlaying or weaving.

In an alternative embodiment the first step S701 may comprise forming a sheet of material and the second step S702 may comprise forming openings therein to allow communication between the first face and the second face of the component. In such embodiments the second step S702 conveniently comprises stamping out the openings. In yet another alternative method of manufacturing, the openings may be formed or resized by stretching.

At the third step the first component manufactured in steps S701 and S702 is combined with a second component, and optionally a third component to form a composite material. The third step S703 comprises bonding the components by adhering and/or welding. The cover sheet comprises a fluid permeable layer FIG. 8 is a schematic flow diagram of a method of providing drainage using a composite material according to an example embodiment of the present invention. The method comprises a first step S801 of installing a composite material as described herein on a substrate. The method further comprises the step S802 of placing material to be drained against the fluid permeable second component. The method may suitably further comprise providing a connection between the composite material and a further drainage structure to carry away fluid that enters into the composite material, for example by overlaying or butting up the composite material against a further sheet thereof.

The components, composite materials and methods described herein are relatively cheap to produce and implement, offer easy installation, and address the problem of insufficient friction between components in the composite material and between a composite material and substrate.

Although the embodiments described herein are intended primarily for drainage of water from moist soil, other related embodiments can also be envisaged as suitable for draining other fluids, including gasses, from other media. Furthermore, the embodiments described may be combined with other components, for example by addition one or more further layers, according to particular engineering requirements. Equally, although the embodiments described herein comprise interconnections between all fluid drainage paths, embodiment of the present invention may provide some non-interconnected drainage paths, and some non-draining elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A component for a composite material, the component comprising: a sheet structure including a plurality of tubular drainage members intersecting one another to provide internal fluid drainage paths that are mutually interconnected by a plurality of openings between the drainage members, wherein the mutually interconnected drainage paths are provided within the sheet structure creating a drainage member material formed by the intersecting drainage members, and wherein the plurality of openings comprise more than 50% of the cross sectional area of the component.

2. The component of claim 1, bounded by a drainage member along each of its edges.

3. The component of claim 1, wherein the fluid drainage paths are arranged to provide a continuous fluid path through the composite material in two non-parallel directions.

4. The component of claim 1, wherein fluid drainage paths of the component are all mutually interconnected.

5. The component of claim 1, wherein the drainage members are formed of crossing strips of drainage material.

6. The component of claim 5, wherein a fluid path is provided at the intersections between the strips of drainage material such that fluid can flow between the strips of drainage material.

7. The component of claim 1 wherein each opening in the component has a boundary comprising a drainage member.

8. The component of claim 1 wherein the drainage members comprise fluid drainage paths that form a first, micro drainage structure of the component, and the drainage members between openings in the component defines a macro drainage structure.

9. The component of claim 8 wherein the micro drainage structure is provided by the fluid drainage paths within the drainage member material.

10. The component of claim 1 wherein the fluid drainage paths are provided by fluid permeable portions of the component.

11. A composite material, the material comprising a first component in combination with a second component, wherein the first component is that of claim 1.

12. The component of claim 1, wherein the openings have a width dimension of greater than 50 mm across the component.

13. The component of claim 1, wherein the openings have a width dimension of greater than 100 mm across the component.

14. The component of claim 1, wherein the openings have a length dimension of greater than 50 mm across the component.

15. The component of claim 1, wherein the openings have a length dimension of greater than 100 mm across the component.

* * * * *